United States Patent
Lee et al.

(10) Patent No.: US 7,184,852 B2
(45) Date of Patent: Feb. 27, 2007

(54) SYSTEM AND METHOD FOR INTEGRATING A DISPATCHING SYSTEM WITH MULTIPLE PROCESS LINES IN A SEMICONDUCTOR MANUFACTURING ENVIRONMENT

(75) Inventors: Hsing-Hung Lee, Hsinchu (TW); King-Chuan Sun, Jhubei (TW); You-Wei Shen, Hsinchu (TW); Yao-Chin Lee, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 270 days.

(21) Appl. No.: 10/819,680

(22) Filed: Apr. 7, 2004

(65) Prior Publication Data
US 2005/0228527 A1    Oct. 13, 2005

(51) Int. Cl.
*G06F 19/00* (2006.01)
(52) U.S. Cl. ...................... 700/115; 700/121
(58) Field of Classification Search .............. 700/105, 700/115, 116, 121, 96
See application file for complete search history.

(56) References Cited
U.S. PATENT DOCUMENTS

| | | | |
|---|---|---|---|
| 4,796,194 A | 1/1989 | Atherton | |
| 5,444,632 A | 8/1995 | Kline et al. | |
| 5,841,677 A | 11/1998 | Yang et al. | |
| 6,128,588 A | 10/2000 | Chacon | |
| 6,240,335 B1 | 5/2001 | Wehrung et al. | |
| 6,470,227 B1 * | 10/2002 | Rangachari et al. | 700/95 |
| 6,678,566 B2 * | 1/2004 | Ho et al. | 700/82 |
| 6,839,601 B1 * | 1/2005 | Yazback et al. | 700/121 |
| 2002/0133259 A1 * | 9/2002 | Hsieh | 700/121 |
| 2003/0014141 A1 * | 1/2003 | Lu | 700/100 |
| 2005/0080501 A1 * | 4/2005 | Shen | 700/115 |

* cited by examiner

*Primary Examiner*—Leo Picard
*Assistant Examiner*—Steven R. Garland
(74) *Attorney, Agent, or Firm*—Haynes and Boone, LLP (57) ABSTRACT

Provided are a system and method for automatically tracking a lot being moved between first and second manufacturing lines during semiconductor manufacturing. In one example, the method includes assigning a first state to the lot to indicate the lot's presence in the first manufacturing line. A trigger event indicating that the lot has been moved to the second manufacturing line may be identified, and a second state may be determined for the lot to reflect the lot's presence in the second manufacturing line. The second state may then be assigned to the lot.

20 Claims, 5 Drawing Sheets

SYSTEM AND METHOD FOR INTEGRATING A DISPATCHING SYSTEM WITH MULTIPLE PROCESS LINES IN A SEMICONDUCTOR MANUFACTURING ENVIRONMENT

BACKGROUND

The present disclosure relates generally to the field of semiconductor manufacturing and, more particularly, to the tracking of a product in two or more processing lines.

A batch of semiconductor wafers (or a wafer in the batch), such as those used to form integrated circuit (IC) devices, are generally tracked during processing by a manufacturing execution system (MES). The batch may be stored within process equipment or in a separate storage facility. Processing of the batch may involve multiple process steps performed on a manufacturing line that may be scheduled and monitored by the MES. However, if a problem develops while processing the batch (or a wafer in the batch), the batch may need to undergo auxiliary processing. This may be accomplished by removing the batch from the current manufacturing line and performing the auxiliary processing on a different manufacturing line (e.g., a disposition line). However, such auxiliary processing may create tracking and scheduling issues. Similarly, moving a batch from one line that is over-capacity to another line with available capacity may also create tracking and scheduling issues.

Accordingly, what is needed is a system and method for addressing these issues.

DETAILED DESCRIPTION

The present disclosure relates generally to the field of manufacturing and, more particularly, to the tracking of a product in two or more processing lines. It is understood, however, that the following disclosure provides many different embodiments for implementing different features of the disclosure. Specific examples of components and arrangements are described below in the present disclosure, and are merely examples, and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
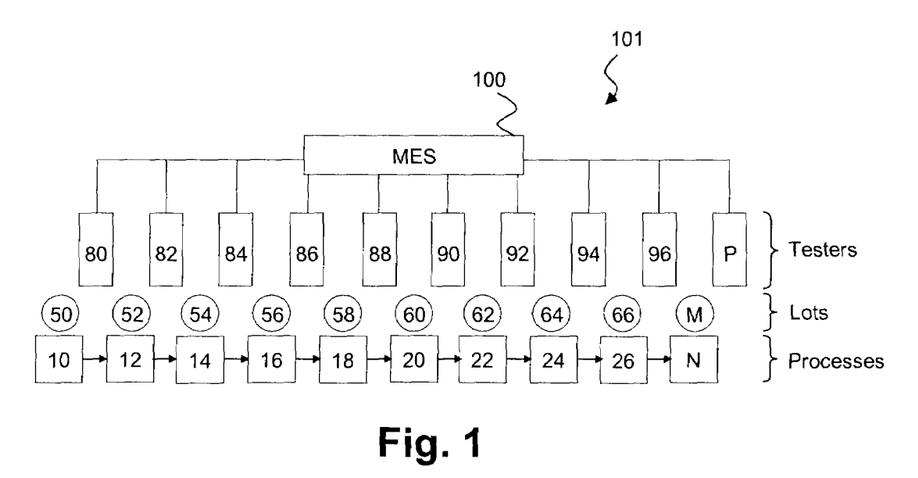
FIG. 1 is a diagram illustrating a single exemplary semiconductor manufacturing line with lots undergoing processing.

Referring to FIG. 1, in one embodiment, a manufacturing (e.g., process) line 101 includes a plurality of manufacturing processes 10, 12, 14, 16, 18, 20, 22, 24, 26, N. Each process (which may be performed by one or more process stations) performs a specific operation on a lot. Although the term "lot" is used in the present disclosure for purposes of illustration, it is understood that the term "lot" may include a lot of semiconductor devices, one or more semiconductor products undergoing manufacture, such as a wafer, a batch of wafers, a single IC, or any other single product or group of products being processed. It is understood that each process 10-N may include multiple steps to completely perform its assigned operations. In the present example, each process 10-N may be a different process, and the illustrated processes include a cleaning process 10 (e.g., for cleaning a wafer), an oxide process 12 (e.g., for growing a field oxide), a removal process 14 (e.g., for removing source and/or drain oxide), a diffusing process 16 (e.g., for diffusing a source and/or drain), a removal process 18 (e.g., for removing gate oxide), another cleaning process 20 (e.g. for cleaning a pregate), a growing process 22 (e.g., for growing a gate oxide), another removal process 24 (e.g., for removing contact oxide), a metallizing process 26, and a patterning process N (e.g., for patterning the metal provided by the metallizing process 26). Although processes 10-N are illustrated, other processes may be substituted and/or added, and/or one or more of the named processes may be removed as appropriate for a specific manufacturing process.

A plurality of lots 50, 52, 54, 56, 58, 60, 62, 64, 66, M may be moved through one or more of the processes 10-N. More specifically, lot 50 is undergoing process 10, lot 52 is undergoing process 12, lot 54 is undergoing process 14, lot 56 is undergoing process 16, lot 58 is going undergoing process 18, lot 60 is undergoing process 20, lot 62 is undergoing process 22, lot 64 is undergoing process 24, lot 66 is undergoing process 26, and lot M is undergoing process N.

Also illustrated in FIG. 1 are multiple testers, designated tester 80, tester 82, tester 84, tester 86, tester 88, tester 90, tester 92, tester 94, tester 96, and tester P. Each tester is associated with one of the processes 10-N and is operable to test a lot after it has passed through the process, as will be discussed more fully below. Each tester is in communication with a manufacturing execution system (MES) 100.

The MES 100 may be connected to a dispatch system and/or a database (neither of which is shown). As will be described later in greater detail, the dispatch system may access information directly from the MES 100, or may access information from the database. The dispatch system may control the movement of lots with respect to the manufacturing line 101 via the MES 100.

Figure 2:
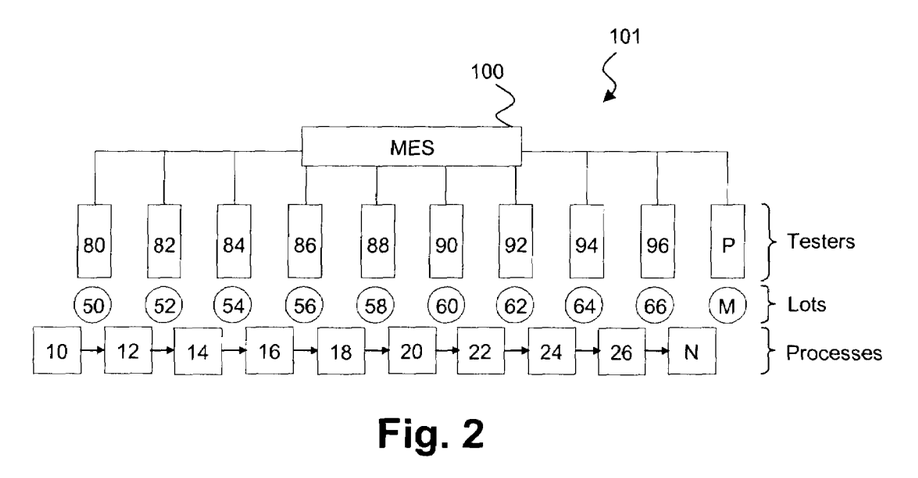
FIG. 2 is a diagram illustrating the manufacturing line of FIG. 1 with lots undergoing testing.

Referring now to FIG. 2, after lots 50-M have undergone processes 10-N, respectively, the lots may be moved to adjacent testers 80-P, respectively. More specifically, tester 80 is testing lot 50, tester 82 is testing lot 52, tester 84 is testing lot 54, tester 86 is testing lot 56, tester 88 is testing lot 58, tester 90 is testing lot 60, tester 92 is testing lot 62, tester 94 is testing lot 64, tester 96 is testing lot 66, and tester P is testing lot M. Based on the information received from testers 80-P, the MES 100 may determine whether lots 50-M have been suitably processed by processes 10-N.

For example, the MES 100 may include information related to one or more acceptable ranges for growing a gate oxide using the process 22. This information may include the chemical properties of the gate oxide, the thickness of the gate oxide, the amount of area that the gate oxide covers, and other parameters. The MES 100 may receive test results from the tester 92, which has just tested lot 62 (that has been processed by process 22). The MES 100 may compare the test results received from the tester 92 with the acceptable ranges to determine whether or not lot 62 was properly processed. If lot 62 was properly processed, the MES 100 may indicate that the lot should proceed to process 24. If lot 62 was not properly processed, the MES 100 may indicate that the lot should be held and possibly removed from the line and reprocessed to fix the gate oxide. In some embodiments, the MES 100 may store the results from each tester 80-P in a memory, so that manufacturing information regarding lots 50-M may be retrieved from MES 100.

It is understood that, although lots 50-M are shown being processed simultaneously in FIG. 1, and are shown being moved simultaneously in FIG. 2, the lots 50-M may be processed at different times and/or moved at different times, and may be moved to holding areas (not shown) as appropriate before and/or after processing and/or testing.

Figure 3:
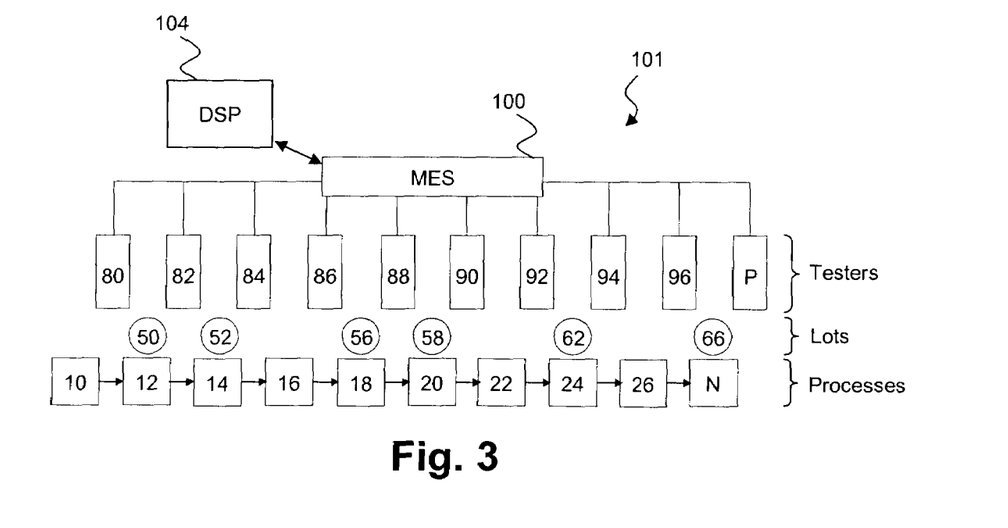
FIG. 3 is a diagram illustrating the manufacturing line of FIGS. 1 and 2 with lots undergoing additional processing after being successfully tested.

Referring to FIG. 3, for purposes of example, lots 50, 52, 56, 58, 62, and 66 were deemed to be within the acceptable ranges as determined by MES 100, and have been moved on to processes 12, 14, 18, 20, 24, and N, respectively. However, lots 54, 60, and 64 did not test within the acceptable ranges of MES 100, and have been transferred from the manufacturing line 101 (e.g., the original line) to a manufacturing line 201 (e.g., a support line). Dotted line 250 shows a separation between original line 101 and support line 201. Support line 201 includes processes 210, 212, 214, 216, 218, 220, 222, 224, 226, and N2 that are parallel to processes 10-N of 101.

Support line 201 may be used to correct errors that occur during processing in original line 101 (e.g., in the lots 54, 60, and 64). Specifically, process 214 may remove source and/or drain oxide from lot 54; process 220 may clean a pregate of lot 60; and process 224 may remove contact oxide from lot 64.

The support line 201 may also include testers 280, 282, 284, 286, 288, 290, 292, 294, 296, and P2 that are connected to an MES 200. After process 214 is completed on lot 54, tester 284 may test lot 54 to determine if process 214 of support line 201 corrected the error of process 14 of original line 101. Similarly, after process 220 is completed on lot 60, tester 290 may test lot 60 to determine if process 220 of support line 201 corrected the error of process 20 of original line 101. Likewise, after process 224 is completed on lot 64, tester 294 may test lot 64 to determine if process 224 of support line 201 corrected the error of process 24 of original line 101. If the MES 200 determines that lot 54 is within an acceptable range based on results received from tester 284, then lot 54 may be returned to original line 101 at process 16, may be processed by support line 201, or may be partially processed by original line 101 and partially processed by support line 201. The MES 200 may make similar determinations regarding lot 60 and lot 64. The MES 200 may store data regarding lots 54, 60, and 64, which may include testing data from testers 284, 290, and 294, as well as other data collected by other testers of support line 201, received from other data sources, and/or entered manually.

The MES 200 may be connected to a dispatch system and/or a database (neither of which is shown). As will be described later in greater detail, the dispatch system may access information directly from the MES 200, or may access information from the database. The dispatch system may control the dispatch of lots with respect to the manufacturing line 201 via the MES 200.

To aid in the tracking of a lot between the manufacturing lines 101, 201, each MES 100, 200 may include two sets of equipment identifiers. For example, each MES may contain a real set and a pseudo set of identifiers. This enables either MES (or a dispatch system) to track the location of a lot on either manufacturing line by assigning a real identifier to a lot being processed on its own manufacturing line and a pseudo identifier to a lot being processed on the other manufacturing line. In some embodiments, each piece of equipment (or process) should have an identifier that is unique to both lines (e.g., only one piece of equipment can have a specific identifier, and no other equipment on either line can have that identifier).

Figure 4:
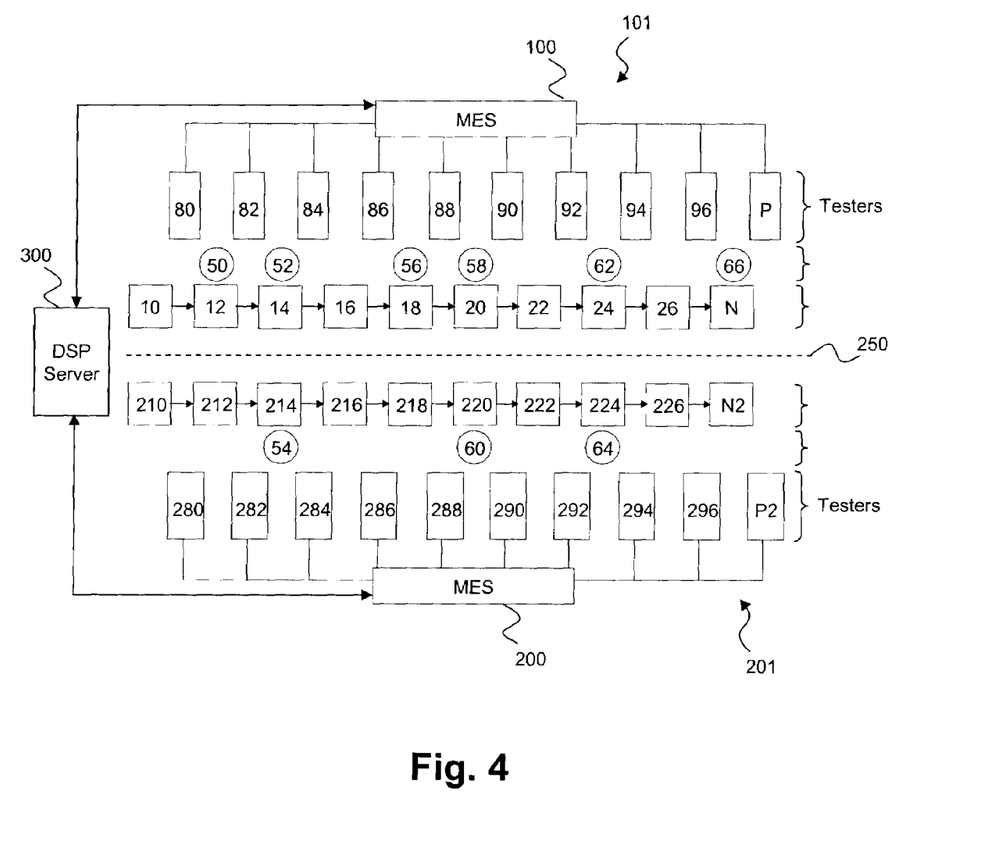
FIG. 4 is a diagram illustrating the manufacturing line of FIG. 1 with an additional semiconductor manufacturing line.

In the present embodiment, a dispatch server 300 is in communication with the MES 100 and MES 200. The dispatch server 300 may access each MES via an interface provided by each MES. The dispatch server 300 may provide functionality that enables the tracking of a lot in and between the manufacturing lines 101, 201. For example, the dispatch server 300 (and/or one or both of the MES 100, MES 200), may include or be associated with tools for aligning a process recipe between the lines 101, 201. The dispatch server 300 may also "release" a tool when finished, indicating that the tool is available for another lot. Furthermore, the dispatch server 300 may include a graphical user interface (GUI) that enables a user to perform certain functions, such as a LotList function (e.g., retrieve a lot list), a LotQuery function (e.g., retrieve information for a lot), a Coming Work-in-Process (WIP) function, a Lot Reserve function, and a Lot Un-reserve function. The dispatch server 300 may access the MES 100 and/or MES 200 to retrieve a lot list or to query for lot information. The dispatch server 300 may then manipulate, sort, or perform other processes on the retrieved data to enable a user to view and/or issue commands related to a particular lot. The GUI of the dispatch server 300 may also be used to place a lot in a multi-trigger state, which will be described in greater detail below.

Figure 5:
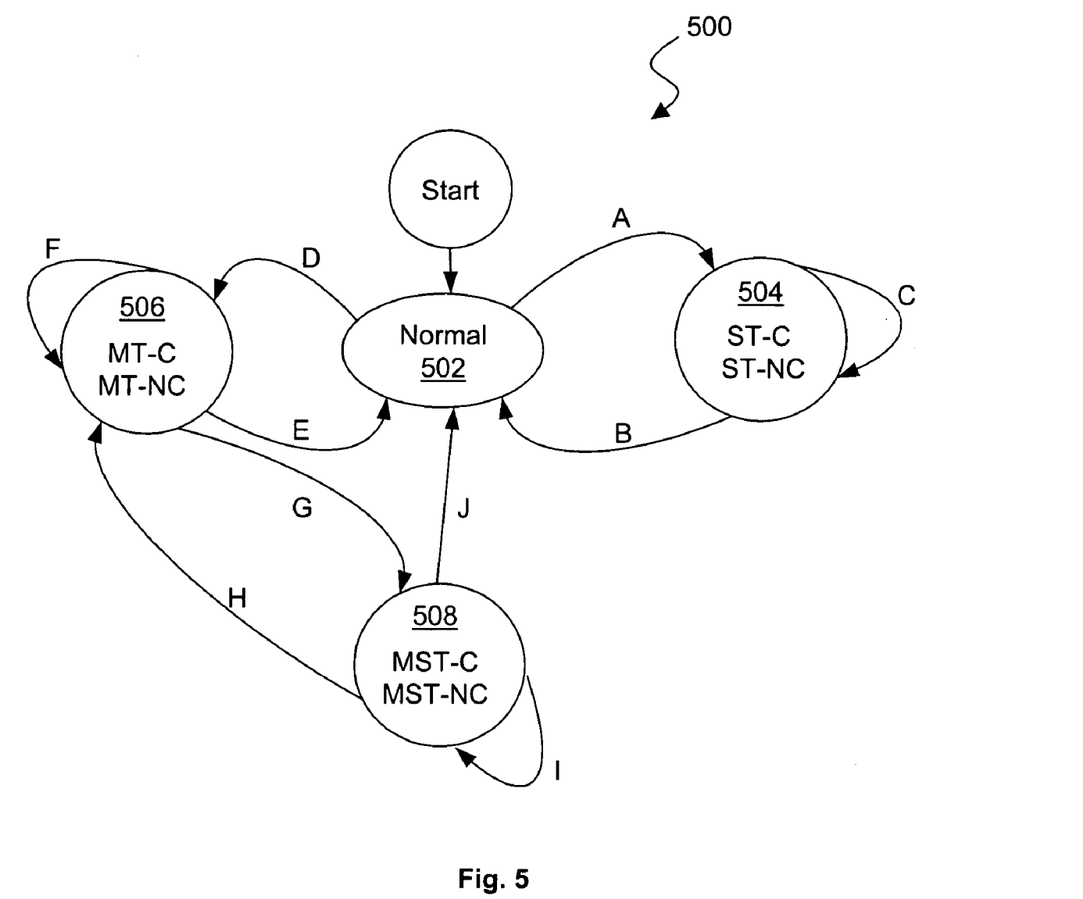
FIG. 5 is a state diagram illustrating exemplary states and state transitions that may be used to monitor a lot moving between the manufacturing lines of FIG. 4.

With additional reference to FIG. 5 and Table 1 (below), a state diagram 500 illustrates one method by which the dispatch server 300 may track a location and status of a lot that may be moved between the manufacturing lines 101, 201. The state diagram 500 of FIG. 5 illustrates four states 502, 504, 506, and 508 which may correspond to designations for a lot, batch and/or a product status as may be observed by a fabrication system. In the present embodiment, a lot is associated with a single state at any given time.

The states include normal state 502, single trigger state 504, multiple trigger state 506, and multiple trigger/single back state 508. Each state (except the normal state) represents one of three trigger types: single trigger (ST), multi-step trigger (MT), or multi-step/single step back trigger (MST). A trigger denotes a lot status change. The ST type trigger indicates that a lot has been moved from the original line 101 to the support line 201 for one process step. The MT type trigger indicates that a lot has been moved from the original line 101 to the support line 201 for multiple process steps. The MST type trigger indicates that a lot has been moved from the original line 101 to the support line 201 for multiple process steps, and the lot will be sent back to the original line 101 for at least one step. In the present example, the triggers (or trigger events) occur when the lot is moved to the other manufacturing line and placed into the manufacturing line's stock (e.g., into inventory) or onto a tool belonging to the manufacturing line. However, it is understood that the state may be changed prior to or during the move to the other manufacturing line.

The normal state 502 may correspond to any state that may be employed or designated in a manufacturing system, but does not include the ST, MT, or MST triggers. For example, a lot being handled only by the manufacturing line 101 would be in the normal state 502. In the present embodiment, each lot begins in the normal state 502, but it is understood that some lots may begin in a trigger state (e.g., one of the states 504, 506, 508) if desired.

In addition, states 504, 506, 508 may indicate whether the support line 201 has the equipment needed for a particular step. If the support line 201 has the equipment capability for a step, the trigger type is associated with "C" (capability). If the support line 201 does not have the equipment capability for a step, the trigger type is associated with "NC" (no capability). As will be described later in greater detail, C and NC may be used to identify whether a lot should be transferred to another line for a particular step. In the present example, it is understood that the original line 101 has the equipment capability for a lot.

As illustrated in FIG. 5 and summarized below in Table 1, transitions may occur between states 502, 504, 506, and 508. In the present example, there are ten exemplary transitions labeled A-J, each of which may move a lot status from one state to another, or which may loop back to the same state (i.e., there is no state change).

TABLE 1

| Action | DESCRIPTION |
|---|---|
| A | Single Trigger (ST): Change lot state from original line to support line for one step |
| B | Cancel ST: Change lot state from support line to original line |
| C | ST: No state change - the next step will continue processing the lot using the support line |
| D | Multi-Trigger (MT): Change lot state to multi-trigger using the GUI |
| E | Cancel MT: Cancel MT lot state using the GUI |
| F | MT: No state change - the next step will continue processing the lot using the support line |
| G | Multi-Trigger/Single Back (MST): The lot state is returned to the original line |
| H | Cancel MST: Return the lot to the support line, or finish running at the original line |

TABLE 1-continued

| Action | DESCRIPTION |
|---|---|
| I | MST: No state change - the next step will continue processing the lot using the original line |
| J | Cancel MST: Return to the normal state using the GUI |

Referring again to FIGS. 1–4 and with continued reference to FIG. 5 and Table 1, in operation, a lot (e.g., the lot 60) may be monitored as follows. As previously described, the lot 60 may be processed by the process 20 (FIG. 1) and tested by the tester 90 (FIG. 2). During this time, the lot 60 is in the normal state 502. However, the MES 100 determines that the process 20 was not properly performed with respect to the lot 60 (based on information provided by the tester 90), and the lot is transferred to the support line 201. The lot's state may be changed to either the single trigger state 504 or the multiple trigger state 506. In the present example, the lot 60 is to be processed using only the process 220 of the support line 201 and then returned to the original line 101. Accordingly, the lot's state may follow transition A and move from the normal state 502 to the single trigger state 504 to indicate the lot's movement from the original line 101 to the support line 201 for a single step. After processing and testing is completed on the lot 60 in the support line 201, the lot 60 may be returned to the original line 101. Accordingly, the lot's state may follow transition B and move from the single trigger state 504 to the normal state 502 to indicate the lot's movement back to the original line 101 for continued processing.

Referring now to Table 2 (below), a number of flags may be used by a dispatch system (e.g., the dispatch server 300) to coordinate a lot's movement between two manufacturing lines (e.g., the manufacturing lines 101, 201 of FIG. 4). In the present example, the dispatch server 300 may use a number of flags or other indicators to monitor the lot's current status. For example, each row of Table 2 includes a state (such as the states illustrated in FIG. 5), a binary "S" flag indicating single trigger operation, a binary "M" flag indicating multi-trigger operation, a binary "C" flag indicating equipment capability, an original line indicator, a support line indicator, and a description.

TABLE 2

| No. | State | S | M | C | Original Line Flag | Support Line Flag | Description |
|---|---|---|---|---|---|---|---|
| 1 | No Release | 0 | 0 | 0 | | | The tool did not release for running on support line |
| 2 | Normal | 0 | 0 | 1 | | | Normal state |
| 3 | ST-C | 1 | 0 | 1 | S | S | Single Trigger: Tools can run on support line |
| 4 | ST-NC | 1 | 0 | 0 | S | | Single Trigger: No tools can run on support line |
| 5 | MT-C | 0 | 1 | 1 | M | M | Multiple Trigger: Tools can run on support line |
| 6 | MT-NC | 0 | 1 | 0 | M | | Multiple Trigger: No tools can run on support line |
| 7 | MST-C | 1 | 1 | 1 | m | m | Multiple Trigger Single Back: Tools can run on support line |

TABLE 2-continued

| No. | State | S | M | C | Original Line Flag | Support Line Flag | Description |
|---|---|---|---|---|---|---|---|
| 8 | MST-NC | 1 | 1 | 0 | m | | Multiple Trigger Single Back: No tools can run on support line |

As illustrated in Table 2, the dispatch server 300 may track eight different states, that are divided into "No Release," "Normal," ST-C, ST-NC, MT-C, MT-NC, MST-C, and MST-NC. It is noted that the last seven states correspond to entries in Table 1 and FIG. 5 (although FIG. 5 combines C and NC states into a single state; e.g., ST-C and ST-NC are both in state 504). The binary flags S, M, and C may be used by the dispatch server 300 to denote a current state for a lot, as well as whether the support line 201 has tools (e.g., equipment) capable of handling the lot. These flags may be stored in three bits. For example, the ST-C state is associated with the bits 101 (for the binary flags S, M, and C, respectively). This indicates to the dispatch server 300 that the ST-C state includes a single trigger, no multi-trigger, and has the tool capability needed for the lot. In contrast, the MST-NC state is associated with the bits 110, indicating that the MST-NC state includes a single trigger, a multi-step trigger, and does not have the needed tools.

Continuing with the previous example of lot 60, when the lot 60 is undergoing testing and processing in the original line 101, the dispatch server 300 may associate the lot with the binary flag values of 001 (e.g., the normal state 502 of FIG. 5). However, when the lot 60 is transferred to the support line 201, the dispatch server 300 may change the lot's flag values to 101 (the ST-C state). It is noted that the dispatch server 300 may also verify the ability of the support line 201 to handle the lot 60 (e.g., the equipment capability of the support line 201 with respect to the lot 60). After processing and testing is completed on the lot 60 in the support line 201, the lot 60 may be returned to the original line 101. To represent this move, the dispatch server 300 may return the lot's flag values to 001 to indicate that the lot 60 is again in the normal state.

In the present example, the lot 60 (and its associated information) may exist only in the MES 100, and not in the MES 200. The dispatch server 300 may access both the MES 100 and the MES 200 to coordinate the movement of the lot 60 (and other lots) between the manufacturing lines 101, 201. In this manner, the amount of information is reduced (stored in a single MES) and a lot can be tracked as it moved between various manufacturing lines.

It is understood that the various fields in Tables 1 and 2 are for purposes of illustration, and that other identifiers and/or formats may be used to achieve similar results. For example, an additional identifier may be added to a state to indicate that a lot has previously been in the state. For example, upon returning to the normal state, an indicator may be modified to denote that the lot has previously been in the normal state. If such an indicator is tracked, it is understood that no two states may be identical for a lot, as the indicator will change to reflect the number of times that the lot has entered that state. In another example, the dispatch system 300 may also monitor the support line's capacity to process a lot. In some embodiments, the dispatch system 300 may be connected to multiple MESes or other systems associated with other manufacturing lines, and may dispatch a lot according to a line's capacity, equipment capability, and/or factors. For example, if the support line 201 does not have the equipment capability for receiving a particular lot from the original line 101, the dispatch server 300 may attempt to locate another line to which the lot may be sent, or may hold the lot until further instructions are received.

In some embodiments, the MES 100 and/or MES 200 may be an integrated computer system representing methods and tools used to accomplish production of a semiconductor device. The functions of the MES 100 and/or MES 200 may include collecting data in delayed or real time, organizing and storing the data in a centralized database, work order management, workstation management, process management, inventory tracking, and document control. The MES 100 and/or MES 200 may be connected to other systems both locally within the factory and outside of the factory (e.g., vendors, customers, engineers, designers, lab facilities, etc.). Examples of MES technology include Promis, Workstream, Poseidon, and Mirl-MES. Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications. The MES 100 and/or MES 200 may include such information as a process step sequence for each product.

In other embodiments, dispatch systems associated with the MES 100 and MES 200 may be in communication, and functionality described above with respect to the dispatch server 300 may be incorporated into one or both of the dispatch systems. This enables one or both of the dispatch systems to track the movement of a lot between the manufacturing lines 101, 201. Accordingly, the dispatch systems may retrieve and coordinate data regarding the manufacturing of lots 50-M from original line 101 and support line 201. This data may be retrieved from one or both of the MES 100, 200, and/or associated databases (not shown). The dispatch systems may also send data from the MES 200 to the MES 100 and vice versa. In still other embodiments, one or more computers (not shown) may be positioned between such dispatch systems to coordinate communications between the dispatch systems.

In still other embodiments, dispatch systems associated with the MES 100 and MES 200 may operate as clients of the dispatch server 300, with the dispatch server accessing the relevant MES through the proper dispatch system. In yet other embodiments, the dispatch systems and/or dispatch server 300 may be integrated with one or both of the MES 100 and MES 200. In other embodiments, the dispatch server 300 may directly access a database to retrieve needed information, rather than one or both of the MES 100 and MES 200. It is understood that the various embodiments may require the installation of additional hardware and/or software on one or both of the MES 100, 200.

Communication between the multiple manufacturing lines 101, 201, the dispatch server 300, and/or other components may be accomplished using a wired and/or wireless network. For example, the communications may be routed via a virtual fab, such as is disclosed in U.S. patent application Ser. No. 10/613,139, filed on Jul. 1, 2003, and hereby incorporated by reference as if reproduced in its entirety.

Figure 6:
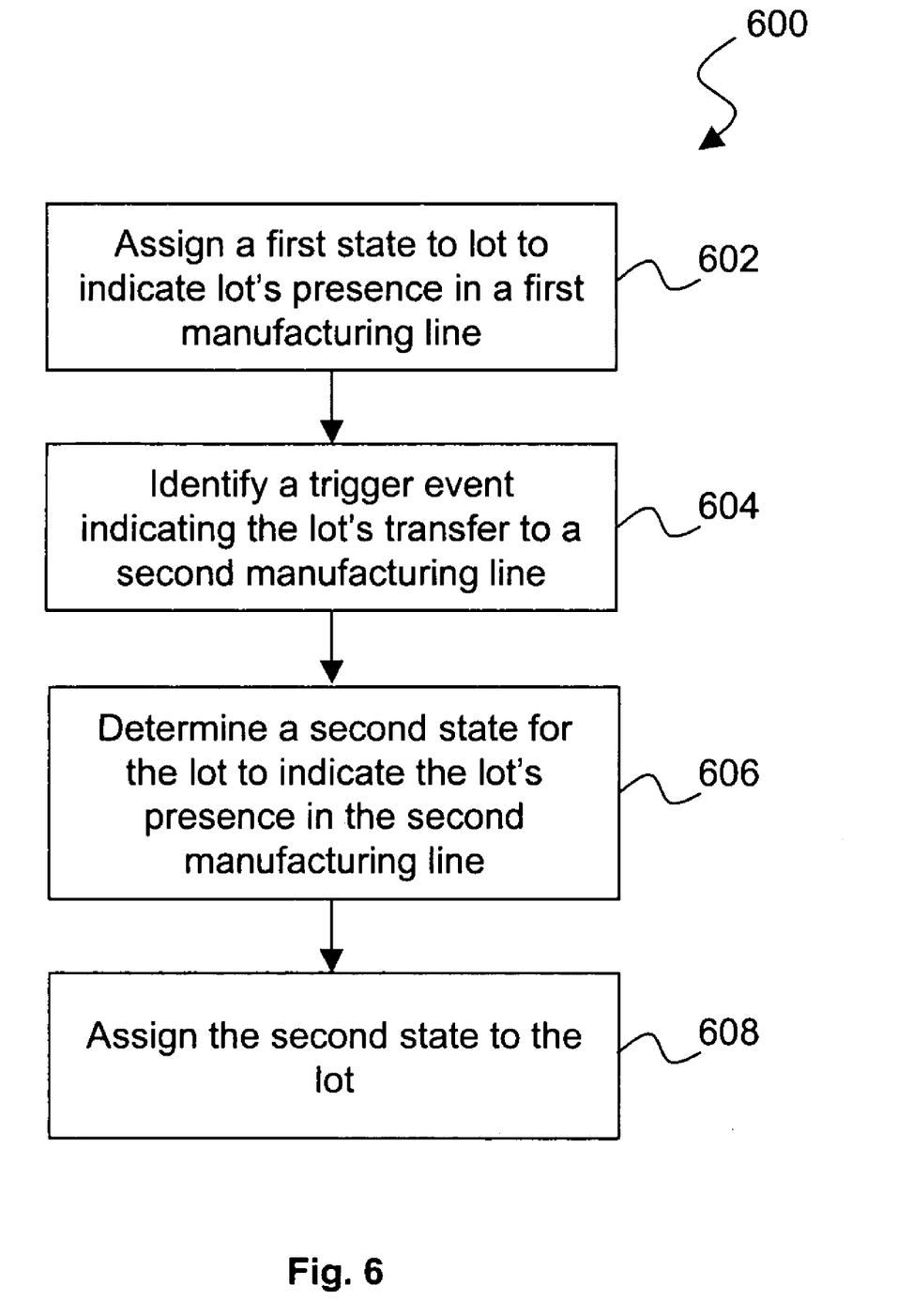
FIG. 6 is a flow chart of an exemplary method for automatically tracking a lot being moved between the manufacturing lines of FIG. 4.

Referring now to FIG. 6, an exemplary computer-executable method 600 may be used to automatically track a lot being moved between first and second manufacturing lines (e.g., the manufacturing lines 101, 201 of FIG. 4) during semiconductor manufacturing. In step 602, the method 600 may assign a first state to the lot to indicate the lot's presence in the first manufacturing line. In step 604, a trigger event may be identified that indicates the lot's transfer to the second manufacturing line. The trigger event may be a lot's failure to pass a test, may be a lot's transfer to another manufacturing line, or may be any other indicator. In step 606, a second state for the lot may be determined as previously described to indicate the lot's presence in the second manufacturing line, and the second state may be assigned to the lot in step 608.

It is understood that, while the preceding embodiments and examples use a dispositioning process for purposes of illustration, the present disclosure may be applied to other processes as well. For example, the present disclosure may be used if one manufacturing line is over-capacity and another manufacturing line has available capacity. One or more lots may be moved to the line having available capacity to better utilize available resources. Accordingly, the present disclosure may be applied to any situation where a lot is moved from one manufacturing line to another.

The present disclosure has been described relative to multiple embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the disclosure may be employed without a corresponding use of other features. Accordingly, it is appropriate that the appended claims be construed broadly and not limited by the scope of the disclosure.

What is claimed is:

1. A method for automatically tracking a lot being moved between first and second manufacturing lines during semiconductor manufacturing, the method comprising:
    assigning a first state to the lot to indicate the lot's presence in the first manufacturing line;
    identifying a trigger event indicating a need for the lot's transfer to the second manufacturing line;
    moving the lot from the first manufacturing line to the second manufacturing line;
    determining a second state for the lot to indicate the lot's presence in the second manufacturing line, wherein the second state is selected from a plurality of states based at least partly on a number of processing steps to be performed on the lot by the second manufacturing line; and
    assigning the second state to the lot.

2. The method of claim 1 wherein the plurality of states include a single trigger state, a multi-step trigger state, and a multi-step/single back trigger state.

3. The method of claim 2 wherein the single trigger state indicates that a single processing step is to be performed on the lot by the second manufacturing line.

4. The method of claim 2 wherein the multi-step trigger state indicates that multiple processing steps are to be performed on the lot by the second manufacturing line.

5. The method of claim 2 wherein the multi-step/single back trigger state indicates that multiple processing steps are to be performed on the lot by the second manufacturing line and that the lot is to be returned to the first manufacturing line for at least one processing step.

6. The method of claim 1 further comprising:
    moving the lot from the second manufacturing line to the first manufacturing line;
    determining a third state for the lot to reflect the lot's presence in the first manufacturing line; and
    assigning the third state to the lot.

7. The method of claim 6 wherein the first and third states are identical.

8. A system for automatically tracking a lot being moved between first and second manufacturing lines during semiconductor manufacturing, the system comprising:
    a first manufacturing execution system (MES) connected to the first manufacturing line;
    a second MES connected to the second manufacturing line; and
    at least a first dispatch system in communication with both the first MES and second MES, wherein the first dispatch system is configured to monitor movement of the lot between the first and second manufacturing lines by associating one of a plurality of states with the lot, the plurality of states including a first group of states associated with the first manufacturing line and including a second group of states associated with the second manufacturing line, the second group of states based at least partly on a number of processing steps to be performed on the lot by the second manufacturing line.

9. A system for automatically tracking a lot being moved between first and second manufacturing lines during semiconductor manufacturing, the system comprising:
    a first manufacturing execution system (MES) connected to the first manufacturing line;
    a second MES connected to the second manufacturing line; and
    at least a first dispatch system in communication with both the first MES and second MES, wherein the first dispatch system is configured to monitor movement of the lot between the first and second manufacturing lines by associating one of a plurality of states with the lot, and
    wherein at least one of the first MES and second MES has first and second sets of equipment identifiers, wherein the first set is used to identify a location of the lot on the first manufacturing line and the second set is used to identify a location of the lot on the second manufacturing line.

10. The system of claim 9 further comprising a second dispatch system in communication with the first dispatch system, wherein the first dispatch system is connected to the first manufacturing line and the second dispatch system is connected to the second manufacturing line.

11. The system of claim 9 wherein each piece of equipment in each of the first and second manufacturing lines is assigned a unique identifier from each of the first and second sets of equipment identifiers.

12. The system of claim 9 wherein the first dispatch system is a dispatch server.

13. The system of claim 9 further comprising a plurality of instructions for execution by the dispatch system, the instructions including:
    instructions for associating a first state with the lot when the lot is being processed by the first manufacturing line;

instructions for associating a second state with the lot when the lot is being processed by the second manufacturing line; and instructions for identifying whether the lot is being processed by the first or second manufacturing line by determining whether the first or second state is currently assigned to the lot.

14. The system of claim 9 wherein the dispatch system retrieves data directly from at least one of the first MES and the second MES.

15. The system of claim 9 further comprising at least one database associated with at least one of the first MES and the second MES, wherein the dispatch system retrieves data directly from the at least one database.

16. The system of claim 9 further comprising a graphical user interface configured to enable a user to select one of the plurality of states for assignment to the lot.

17. A computer readable medium having a plurality of instructions stored thereon for tracking a lot that may be processed by both first and second manufacturing lines, the instructions comprising:

assigning a first state to the lot, wherein the first state signals that the lot is being processed by the first manufacturing line;

monitoring the first manufacturing line for an error in processing indicating a need for the lot's transfer from the first manufacturing line to the second manufacturing line;

identifying an error in processing indicating a need for the lot's transfer from the first manufacturing line to the second manufacturing line;

moving the lot from the first manufacturing line to the second manufacturing line; and assigning a second state to the lot, wherein the second state is based upon the number of processes to be performed on the second manufacturing line.

18. A computer readable medium having a plurality of instructions stored thereon for tracking a lot that may be processed by both first and second manufacturing lines, the instructions comprising:

assigning a first state to the lot, wherein the first state signals that the lot is being processed by the first manufacturing line;

monitoring the first manufacturing line for an error in processing indicating a need for the lot's transfer from the first manufacturing line to the second manufacturing line;

identifying an error in processing indicating a need for the lot's transfer from the first manufacturing line to the second manufacturing line;

moving the lot from the first manufacturing line to the second manufacturing line;

assigning a second state to the lot; and moving the lot from the second manufacturing line to the first manufacturing line.

19. The computer readable medium of claim 18 further comprising assigning a third state to the lot.

20. The computer readable medium of claim 19 wherein the third state is the same as the first state.

* * * * *